(12) United States Patent
Leidich et al.

(10) Patent No.: US 9,391,770 B2
(45) Date of Patent: Jul. 12, 2016

(54) METHOD OF CRYPTION

(75) Inventors: Russell Merritt Leidich, Baltimore, MD (US); Stuart Paul Christmas, Singapore (SG); Luke Willem Janssen, Singapore (SG)

(73) Assignee: Tigerspike Products, Pte. Ltd, Singapore (SG)

( * ) Notice: Subject to any disclaimer, the term of this patent is extended or adjusted under 35 U.S.C. 154(b) by 0 days.

(21) Appl. No.: 14/407,908

(22) PCT Filed: Jun. 12, 2012

(86) PCT No.: PCT/US2012/042099
§ 371 (c)(1),
(2), (4) Date: Dec. 12, 2014

(87) PCT Pub. No.: WO2013/187887
PCT Pub. Date: Dec. 19, 2013

(65) Prior Publication Data
US 2015/0172045 A1    Jun. 18, 2015

(51) Int. Cl.
*H04L 9/08* (2006.01)
*H04L 9/06* (2006.01)
*H04L 9/14* (2006.01)

(52) U.S. Cl.
CPC ............ *H04L 9/0822* (2013.01); *H04L 9/0618* (2013.01); *H04L 9/0643* (2013.01); *H04L 9/0656* (2013.01); *H04L 9/14* (2013.01); *H04L 2209/24* (2013.01)

(58) Field of Classification Search
CPC . H04L 9/0618; H04L 9/0956; H04L 2209/24; H04L 9/14

USPC ................................................... 380/281, 279
See application file for complete search history.

(56) References Cited

U.S. PATENT DOCUMENTS

| | | | |
|---|---|---|---|
| 4,195,200 A * | 3/1980 | Feistel | 380/37 |
| 2003/0016826 A1* | 1/2003 | Asano et al. | 380/277 |
| 2003/0133568 A1* | 7/2003 | Stein et al. | 380/37 |
| 2003/0210783 A1* | 11/2003 | Filippi | 380/44 |

FOREIGN PATENT DOCUMENTS

| | | |
|---|---|---|
| EP | 1109350 B1 | 10/2005 |
| KR | 1020080052092 A | 6/2008 |
| WO | 2013187887 A1 | 12/2013 |

OTHER PUBLICATIONS

"Driving an NP-Complete problem with Combinatorial Decomposition to generate a unique and irreversible bitstring from a single integer seed value", by S.Christmas, R.Leidich, Jan. 7, 2013.*

(Continued)

*Primary Examiner* — Saleh Najjar
*Assistant Examiner* — Peiliang Pan

(57) ABSTRACT

A method for crypting one or more data blocks comprising: providing a main table 100 comprising a circular array of K randomly distributed bits with a predetermined start point, generating a master key 504 based on a series expansion of a user key, generating a first set of tumblers 506 using the master key, wherein each element of the master key defines a unique bitwise rotation of the main table from the predetermined start point, performing an XOR operation on the first set of tumblers to form a mask of K bits 508; generating a block key 512 based on the mask; and crypting 514 the one or more data blocks with an XOR operation of the block key.

15 Claims, 2 Drawing Sheets

(56) References Cited

OTHER PUBLICATIONS

Foreign Communication From a Related Counterpart Application, International Search Report dated May 9, 2013, International Application No. PCT/US2012/042099 filed on Jun. 12, 2012.
Foreign Communication From a Related Counterpart Application, International Preliminary Report on Patentability dated Dec. 24, 2014, International Application No. PCT/US2012/042099 filed on Jun. 12, 2012.
Horowitz, Ellis, et al., "Computing Partitions with Applications to the Knapsack Problem", Cornell Univesirty, New York, Journal of the Association for Computing Machinery, vol. 21, No. 2, Apr. 1974.

* cited by examiner

METHOD OF CRYPTION

CROSS-REFERENCE TO RELATED APPLICATIONS

This application is a filing under 35 U.S.C. 371 as the National Stage of International Application No. PCT/US2012/042099, filed Jun. 12, 2012, entitled "A METHOD OF CRYPTION", which is incorporated herein by reference in its entirety for all purposes.

FIELD

The present invention relates to a method of cryption.

BACKGROUND

General-purpose quantum computers, if implemented in accordance with contemporary theory, would be well suited to cracking existing popular encryption algorithm such as RSA and AES.

The reason for this susceptibility is that quantum computers could theoretically test $4^N$ possible solutions simultaneously, given N qubits ("quantum bits") of storage. In reality, the performance would be lower, on account of "junk bits", which are unique to quantum computing, and other overhead. Nevertheless, exponentially better performance is expected. Taken to the extreme conclusion, most industry-standard cryptosystems could be cracked in polynomial time with respect to key length.

It should be noted that at present, the largest quantum computer in use has only 128 qubits, and can only be used to solve a very narrow class of math problems.

SUMMARY

In general terms the invention proposes storing large tables of data for cryption (meaning encryption or decryption) purposes as a defence against a quantum computer attack. For example the table size may be $2^{16}$ bits, which may far exceed the storage capacity of quantum computers for the foreseeable future. The tables cannot be stored in an external storage device to the quantum computer, as any such adjunct would need to participate in the superposition, which would amount to the same technological problem as appending qubits.

Moore's Law might suggest in just a few years we will have quantum computers capable of storing, say, $2^{16}$ qubits. However, due to persistent technological challenges it would appear that qubit density will evolve at a rate far less than that indicated by Moore's Law. Quantum error correction may improve the situation, but thus far remains theoretical. Even then progressively increasing quantum computer size might be defended by a corresponding increase in internal data table size; as opposed to increasing key length as employed by industry-standard algorithms.

One or more embodiments may have the advantage(s):
Roust protection against attacks by quantum computing,
Improved computational performance,
Improved power consumption,
Uniform cryptographic strength over various bits of a file,
Ciphertext that does not depend upon the plaintext for pseudo-randomness,
It is based upon a non-polynomial-time computation problem (also known as an NP problem), demonstrating a linkage to a known mathematical problem, thus having more credibility,
Adaptable to high-bandwidth implementations, and/or
Improved parallelizability of the cryption process.

In a first specific expression of the invention there is provided a method for crypting one or more data blocks comprising:
providing a main table comprising a circular array of K randomly distributed bits with a predetermined start point,
generating a master key based on a series expansion of a user key,
generating a first set of tumblers using the master key, wherein each element of the master key defines a unique bitwise rotation of the main table from the predetermined start point,
performing an XOR operation on the first set of tumblers to form a mask of K bits;
generating a block key based on the mask; and
crypting the one or more data blocks with an XOR operation of the block key.

Embodiments may be implemented according to any of claims 2 to 16.

BRIEF DESCRIPTION OF THE DRAWINGS

One or more example embodiments of the invention will now be described, with reference to the following figures, in which.

DETAILED DESCRIPTION

Figure 1:
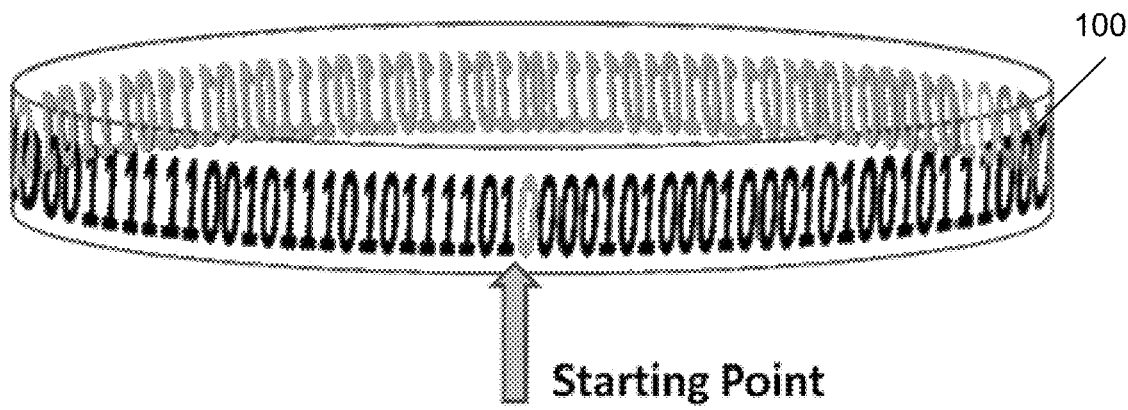
FIG. 1 is a schematic of a main table according to a first embodiment

A cryptosystem according to the first embodiment is shown in FIG. 1, including a "Main table" 100. The main table is a string of bits, containing randomly distributed 0s and 1s in equal numbers. The string is considered to be a "circular array", so that the first and last bits are effectively neighbours.

Quantum-resistance may occur when all the bits in this table must be stored contemporaneously in the qubits of an attacking quantum computer in order to break the encryption. As noted above, the rate of advances in quantum computing suggests that only a very small table size needs to be employed in order to offer protection in this manner for the foreseeable future. Despite the requirement for a small table size, size of the Main table is nonetheless $2^{16}$ bits. This value implies a block size of 4KiB, which is consistent with operating system and hard drive storage unit sizes.

A graphical representation of the Main table is shown in FIG. 1. The table has a predetermined "Start Point" for the cryption process.

In order to facilitate globally compatible implementations, the Main table is unique and standardised. In principal, of course, it is possible to create a deliberately incompatible implementation merely by creating a new table: the table in military use could differ from the one designed for use with cellular phones, which could again differ from the one used for medical device implants.

Note also that security has nothing at all to do with the secrecy of the table, and the Main table can be published being used without fear of compromise. So far as we can see, the only thing that will compromise the system is knowledge of the key itself, in its entirety. Partial knowledge of the key does not imply partial decryption, in any useful statistical sense.

The One-Time Pad

Textbooks on cryptography tend to introduce the concept of a "One-Time Pad" (OTP) at the beginning, before dismissing it as being an unrealistic and impractical solution. The OTP is effectively an encryption key that is as long as the file being encrypted, and XOR'd in a bitwise manner with the file, in order to accomplish cryption. In practice, this would necessitate keys of a size far beyond the bounds of human memory. They would therefore need to be stored on digital media, which introduces obvious other vulnerabilities.

However, according to an example embodiment, a single key of "pen-writable" length can be expanded into a "running OTP" that continues to expand, via the Main table, in a non-repeating manner, until it is as long as the file being crypted. Processes including "combinatorial decomposition", "churning", and/or the use of a randomly generated Initial Value (IV), a unique OTP can be generated from a far shorter "seed" key, named the "protomaster key" or "user key". Thus, the security and/or highly parallel nature of an OTP can similarly be achieved. The only disadvantage compared to an OTP may be that the OTP would be totally intractable to a brute-force attack in terms of navigating through the keyspace; whereas once expansion from the protomaster key is known, the effective keyspace is smaller. However, when using the recommended protomaster key lengths of $2^7$ to $2^9$ bits, this may still be intractable in practice.

The Protomaster Key

The initial step is to create a "master key" from the key visible to the user (the protomaster key). This is done by "combinatorial decomposition".

The protomaster key is considered to be a uniformly distributed integer, with a size ranging from $2^7$ to $2^9$ bits, which is known to all parties involved in a secret conversation. Less ideal would be a user-generated key, in which case the ASCII characters are taken as their hexadecimal equivalents, then concatenated into a single large integer. The user-generated case is considered less preferable as it is open to dictionary attacks, brute force attacks in the event of short passwords, and known-enemy attacks in which an associate can guess your password based on their knowledge of you.

SOME DEFINITIONS AND CONCEPTS

The encryption process uses rotations of the Main table. This is best explained pictorially. Take the sample circular table shown in FIG. 1, and imagine rotating it from the highlighted starting point, toward the least-significant bit, by 27 places. This rotated table is named a "tumbler", as it serves a purpose analogous to the tumblers of the locks on a briefcase. Imagine such a briefcase, with the typical 6 tumblers, 3 on each side of the handle. In order to open the briefcase, each tumbler must be set to the correct number. So if you knew in advance the combination was "7-0-2-8-9-2", you could just rotate the numbers to those locations, and the briefcase would open. If any one single tumbler were not set correctly, then the case would not open.

Thus, given the Main table size of $2^{16}$ bits, we have $2^{16}$ possible 16-bit tumblers, numbered from 0 to $2^{16}-1=65535$.

So the XOR operation of multiple rotations of the Main table is described by a tumbler set. In other words, say we are given tumblers 341, 573, and 1,204. The operation involves first rotating the table 341 places to the right and storing it. Then, the original table (not the rotated table) is rotated 573 places to the right and stored. Finally, the original table (again, not the previously rotated table) is rotated 1204 places, and all three rotations are XOR'd together to an "XOR mask" or "bit mask" of the same size as the original table ($2^{16}$ bits).

Figure 2:
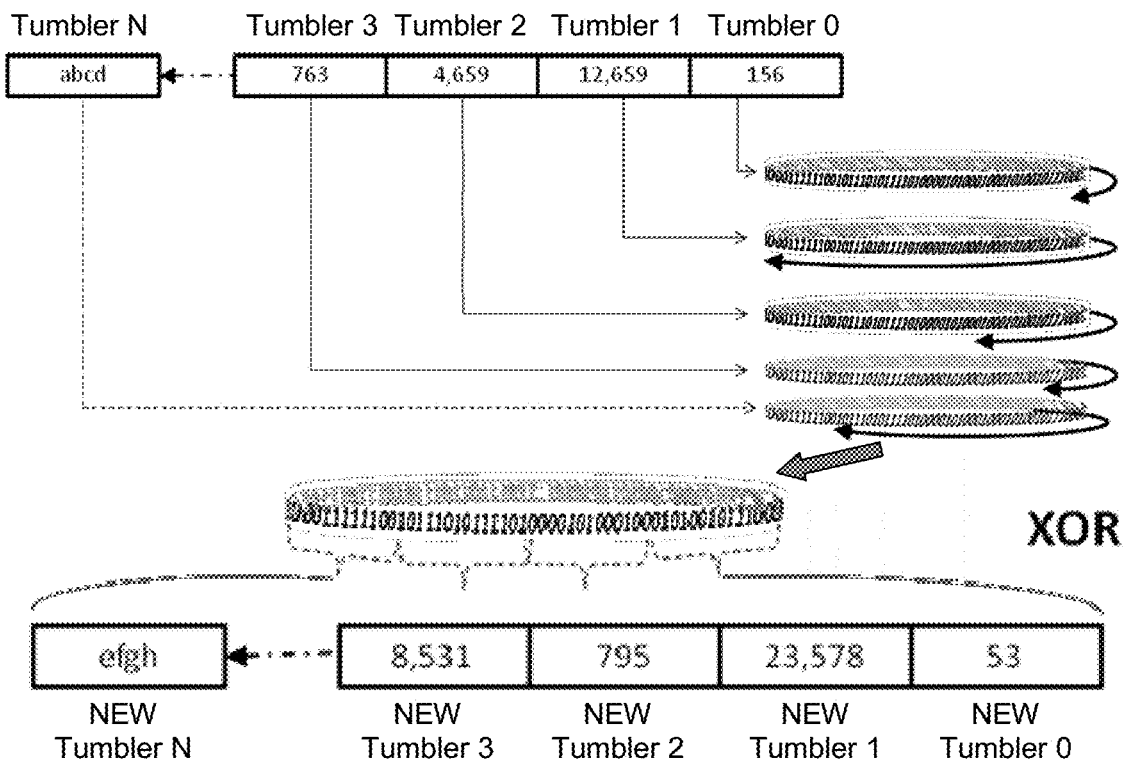
FIG. 2 is an illustration of the churning between different tumblers using the main table in FIG. 1.
Figure 3:
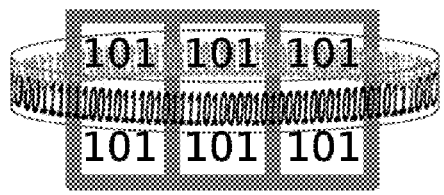
FIG. 3 is a symbol representing the churning process.

The bit position of the start point is known, we can count off 16-bit chunks from the newly created XOR mask. In addition to other data structures, this gives us a whole new set of tumblers. The process of forming a XOR mask in this manner is named "churning". This whole operation can then be repeated, with the new tumblers describing further rotational components of the next XOR mask to be formed from the same Main table, and hence yet another set of tumblers as shown in FIG. 2:

The churning process will later be represented by the symbol in FIG. 3:

Key Sequencing Summary

Figure 5:
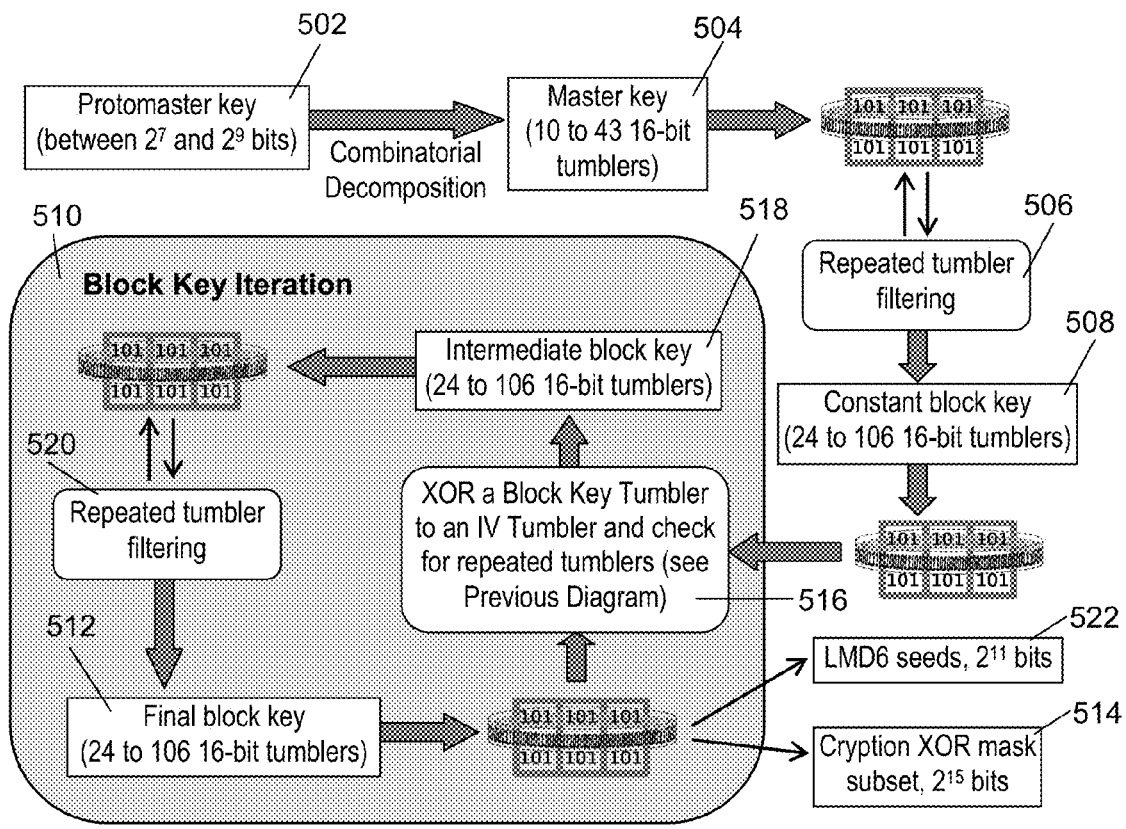
FIG. 5 is a flow diagram of the key sequencing process.

A method of Key Sequencing 500 is shown in FIG. 5. The protomaster key is provided 502 and is converted to the Master Key used for encryption via combinatorial decomposition 504. The master key is then put through the churning process previously described (with checking for and discarding of) repeated tumblers 506. This gives a "constant block key" 508 which is fed into the block key iteration process 510, which gives us a final block key 512, used as an XOR mask for cryption 514 of blocks of the file in question.

The block key iteration 510 is done by an XOR of the constant block key with a random "initial value" 516, which is effectively churned twice 518 (with checking 520 for and discarding repeated tumblers), which gives us a [table-sized] XOR mask 512, half of which we used for cryption 514 of the current "block", half of which is used for seeds of the LMD-6 secure hash 522.

Combinatorial Decomposition and Master Key Derivation

In an example embodiment combinatorial decomposition is used to turn the protomaster key into a set of tumblers such that no two tumblers are repeated. The reason for not allowing repeated tumblers is that (n) XOR (n)=0, which may weaken the computational complexity of reversing the implied XOR mask back to the tumbler set.

Before going into the algorithm for combinatorial decomposition, some examples will be demonstrated with small numbers to aid in understanding the process.

Consider a very small hypothetical Main table, with only 6 bits: [011010]. Remember this is really a ring, so the 2 end 0's are actually next to each other. The possible rotations of the table, each of which described by a unique tumbler, are shown below. We will label them $[m_0]$ for the first rotation (of zero places, i.e. the original table) through to $[m_5]$, which is a full rotation aside from one place (another rotation would bring it back to the beginning), equivalent also to a rotation of one place in the direction away from the least-significant bit.

| 011010 | 110100 | 101001 | 010011 | 100110 | 001101 |
|---|---|---|---|---|---|
| $m_0$ | $m_1$ | $m_2$ | $m_3$ | $m_4$ | $m_5$ |

In order to generate a master key from the protomaster key, we must identify a minimal subset of these tumblers, which preserves all of the information in the protomaster key. So, for instance, this could be $[m_0, m_3, m_5]$ or $[m_2, m_3, m_4, m_5]$ or just $[m_4]$.

First, we need to determine how many tumblers we will need, at minimum. Specifically, we need to find the minimum number of tumblers, M, such that

[number of possible tumblers(=Main table size)]$nCr$
$[M]>P$

Where (nCr) is the standard combination function and P is the protomaster key expressed as an integer.

Because the protomaster key length is bounded to the range of $2^7$ and $2^9$ bits, the maximum value of P can be precomputed and stored in a lookup table, in order to greatly reduce computation time. $2^7$ bits corresponds to a minimum of 10 tumblers, so the size of the lookup table can be reduced by taking M=10 as the lower bound (and M=43 as the upper bound), corresponding to a Main table comprised of $2^{16}$ bits, and a protomaster key length within the range specified above.

So given the above example of a hypothetical 6-bit Main table, and a (randomly chosen) protomaster key of P=18, we can show that the minimum number of tumblers required (in this small example) is M=3, since $6nCr2=15$ (less than $P$, therefore not acceptable) and $6nCr3=20$ (greater than $P$ as required).

Thus M=3.

So we know that we need to select 3 tumblers from $[m_0 \ldots m_5]$ above in such a way that there is a unique tumbler set corresponding to every P.

We also desire an algorithm that finds the tumblers in descending order. This helps to ensure that no tumblers are repeated, and also protects against finding the same tumbler set in a different order (which would imply that the tumbler set was not unique because XOR is commutative).

We can write the value of P such that:

$P=(m_0 nCrM)+(m_1 nCrM-1)+(m_2 nCrM-2)+\ldots (m_{M-1} nCr1)$ in concert with the conventions that $(n\ nCr\ (n+1))=0$ and $(n\ nCr\ n)=1$. The above expansion is possible because a table of $2^{16}$ bits affords more than $2^{512}$ unique combinations of 43 rotations thereof, corresponding to the upper bounds of P+1 and M, respectively. That is, $(2^{16}\ nCr\ 43)>2^{512}$.

It may seem like this invites the possibility of repeated tumblers, but the $m_n$ values are not fully independent of one another. Take the illustrative case of P=56 with 5 tumblers and a hypothetical Main table size of 12 bits. Note that the Main table size is not important, so long as it's large enough to accommodate the appropriate number of tumblers.

So for 5 tumblers, we have M=5 (by definition), so the first part of the above expression for P is simply (8 nCr 5) which is 56, thus we have reconstructed the protomaster key in just the first part of the expression, with just 1 tumbler. But since we still have to assign a unique rotation of the Main table to the remaining 4 tumblers (since we decided we wanted 5 tumblers), we can set them to [3, 2, 1, 0]:

[8, 3, 2, 1, 0]

$P = (8nCr5) + (3nCr4) + (2nCr3) + (1nCr2) + (0nCr1)$ $P = 56 + 0 + 0 + 0 + 0$ $P = 56$

Thus all rotations of the Main table are unique, as required. The only situation in which P cannot be reconstructed is if we don't have enough tumblers, which is preempted by the aforementioned condition in which a value of M is chosen such that:

[Main table size in bits]$nCr[M]>P$

Incidentally, it is not necessarily advantageous to have more tumblers than are required, as one ends up in a situation in which the "extra" tumblers in higher bit positions are highly deterministic, and generally just descending by 1s. Thus no additional entropy is added, resulting in wasted computation time. Depending on the application a reasonable engineering compromise between short key protection and wasted tumblers may be a minimum of M=10.

Returning to the 6-bit Main table example, M=3, and we assume a randomly chosen protomaster key of P=18. It is helpful at this stage to restate the equation $P=(m_0 nCrM)+(m_1 nCrM-1)+(m_2 nCrM-2)+ (m_{M-1} nCr1)$ which in this case simplifies to $P=(m_0 nCr3)+(m_1 nCr2)+(m_2 nCr1)$ We need to then find the largest possible $m_0$ such that ($m_0$ nCr 3) is not greater than P (else the above equation is immediately violated and we clearly aren't finding P). This can be found in a number of ways, including a brute force search in which $m_0$ is increased from 2 (because we know that we need space for at least 2 lesser tumblers) until ($m_0$ nCr 3)>P, then subtracting from P, and repeating an analogous process for $m_1$ and $m_2$, ultimately leaving 0 on the left side of the equation. A more efficient method is a binary search for the descending $m_n$'s over their allowed values, converging first on $m_0$, then $m_1$, etc.

Assuming we find this $m_0$ such that ($m_0$ nCr 3)=X, we thus have:

$P-X=(m_1 nCr2)+(m_2 nCr1)$

The object is to find the largest X, and thus the largest $m_0$, such that (P-X) is whole. This process can be iterated until the entire protomaster is found. Using our example, we find the tumblers as:

[5, 4, 2]

And this can be verified as follows:

$(5nCr3) + (4nCr2) + (2nCr1) = 18$ $10 + 6 + 2 = 18$

In the case of forcing 10 tumblers with small keys, the tumblers come out as:

[11, 9, 8, 7, 6, 5, 4, 3, 1, 0]

With the combinations resulting in:

$(11nCr10)+(9nCr9)+(8nCr8)+(7nCr7)+(6nCr6)+ (5nCr5)+(4nCr4)+(3nCr\ 3)+(1nCr2)+(0nCr1)$ $11+1+1+1+1+1+1+1+0+0=18$

Thus, we have shown how to use the system of combinatorial decomposition to turn the protomaster key into a unique and nonrepeating tumbler set, known as the "master key".

Binary Search for Tumbler Sets

Before moving on to the main cryptographic engine, we demonstrate a method of finding the maximum ($m_n$)s faster than via the brute-force search above. In the case of the Main table, we know that $m_0$ must be on [M−1, $2^{16}$−1]. Any less than M−1 and there can't possibly be M tumblers, or greater than $2^{16}$−1 and it doesn't represent a unique rotation of the Main table (as it would have "wrapped around" and would no longer be unique). So we execute a binary search over this domain to find the greatest ($m_0$ nCr M) that is not greater than P. For $m_1$, we can further reduce the domain to [M−2, $m_0$−1]. The lower bound is lower as we have fewer tumblers remaining to find (since we subtracted X=($m_0$ nCr M) from P, leaving the left side as P-X) and the upper bound is one less than the $m_0$ just found as we are looking for the next lesser tumbler. Thus this approach to combinatorial decomposition improves upon brute force.

A Real-World Example

The above examples use small numbers to illustrate the theory involved, but are clearly not examples of a secure system by any means. As described, key sizes of $2^7$ to $2^9$ bits are required, along with a Main table size of $2^{16}$ bits. Thus a typical key and corresponding tumbler set would look as follows:

Protomaster Key in Hex format: FEDCBA9876543210FEDCBA9876543210

Combinations: $(32286nCr10)+(32188nCr9)+(31273nCr8)+(24609nCr7)+(24444 nCr6)+(22362nCr5)+(21029nCr4)+(18123nCr3)+(11302nCr2)+(7367nCr1)$ Tumblers: [32286, 32188, 31273, 24609, 24444, 22362, 21029, 18123, 11302, 7367]

XOR Mask Anatomy

The tumblers, which represent unique rotations of the Main table, will be XOR'd together to create a XOR mask. A XOR mask contains three types of data structures, as follows:

| Base Offset in Bytes | Last Offset in Bytes | Bytes | Description |
|---|---|---|---|
| 0 | 3839 | 3840 | Space for generating up to 1920 tumblers. Used to convert the master key to the constant block key, and block keys to other block keys. Provides plenty of extra tumblers in order to guarantee uniqueness. (Seldom more than 130 of these are ever used, even in the specification limit of a 512-bit protomaster key; the odds of needing all 1920 are negligible.) |
| 3840 | 4095 | 256 | Seeds for the LMD6 hash of (the block to be crypted by the mask in the next field) which are contextually implied, and thus not stored in the encrypted file. For details, see "The LMD6 Secure Hash" section. |
| 4096 | 8191 | 4096 | XOR mask subset for cryption purposes. |

Conversion of Master Key to Constant Block Key

Now that we have generated the master key, we must generate the key used for the file header cryption. As in the case of the combinatorial decomposition of the protomaster key, this process is deterministic, so its output can be cached in physically secure memory.

A block key is defined as a key which selects rotations of the Main table giving rise to a XOR mask of the form indicated in the table above. All block keys contain the same number, T, of tumblers, which is always at least double that in the master key.

Whilst we have M tumblers in the master key, we will need to expand this to a larger tumbler set for block cryption purposes. The reason is explained in the "Viable Attacks" section, but is essentially to make it easier to try every possible master key, than to revert a known XOR mask into its constituent tumblers. The exact mapping of the number of tumblers in the master key to the number of tumblers in the block keys is provided in the source code. Suffice to say that 10 or 43 master key tumblers expand to 24 or 106 block key tumblers, respectively. The expanded set size accounts for the minimum-known computational complexity of reverting a XOR mask into its constituent tumblers.

At this point the process of taking a series of tumblers and XOR'ing their implied table rotations together to create a new XOR mask will be revisited. As always, each 16-bit tumbler of a master key or block key describes a rotation of the Main table.

The process of creating the "constant block key" from the master key is as follows: Use the tumblers in the master key to select a set of rotations of the Main table. For example, if we have 10 tumblers, we have 10 rotations of the Main table. XOR these together to create a XOR mask (following the large arrow in the above diagram). The first 16-bit chunk is the first tumbler of the so-called "constant block key" (because this key is constant for a given protomaster), which for purposes of the next section, we can also consider to be "Block Key 0". (Only block keys with even indices greater than 0 are used to create XOR masks which are in turn used for block cryption; all other block keys are simply iterated to form subsequent block keys.)

Performing the XOR operation on the whole table rotation may not be necessary. The reason is that we can never allow repeated tumblers, so each tumbler needs to be compared to all previous tumblers derived from the same XOR mask. If a repeated tumbler occurs, we discard it and select the next 16 bits of the XOR mask. (In practice, a bitmap can be used to detect tumbler repetition, which avoids an $O(M^2)$ look back.) Since the XOR mask allows for 1920 possible tumblers, the chances of not finding 106 unique ones (in the maximum case, see next section) in that space are negligible.

Generation of Block Key (N+2) from Block Key N (Block Key Iteration)

We now have between 24 and 106 unique tumblers that can be used for cryption purposes. In order to prevent statistical attacks, it is imperative the same XOR mask never be reused. To this end, we employ an Initial Value ("IV"), which consists of 384 random bits, or random bit string.

A random number generator may be used to generate the IV, for eaxmple a userspace true random number generator which requires no operating system calls. For example the IV may be derived from unbiased physical noise.

The IV generated may be 384 bits long. This specific number is designed to align with the least possible block key tumbler count of 24 (=384 bits).

Figure 4:
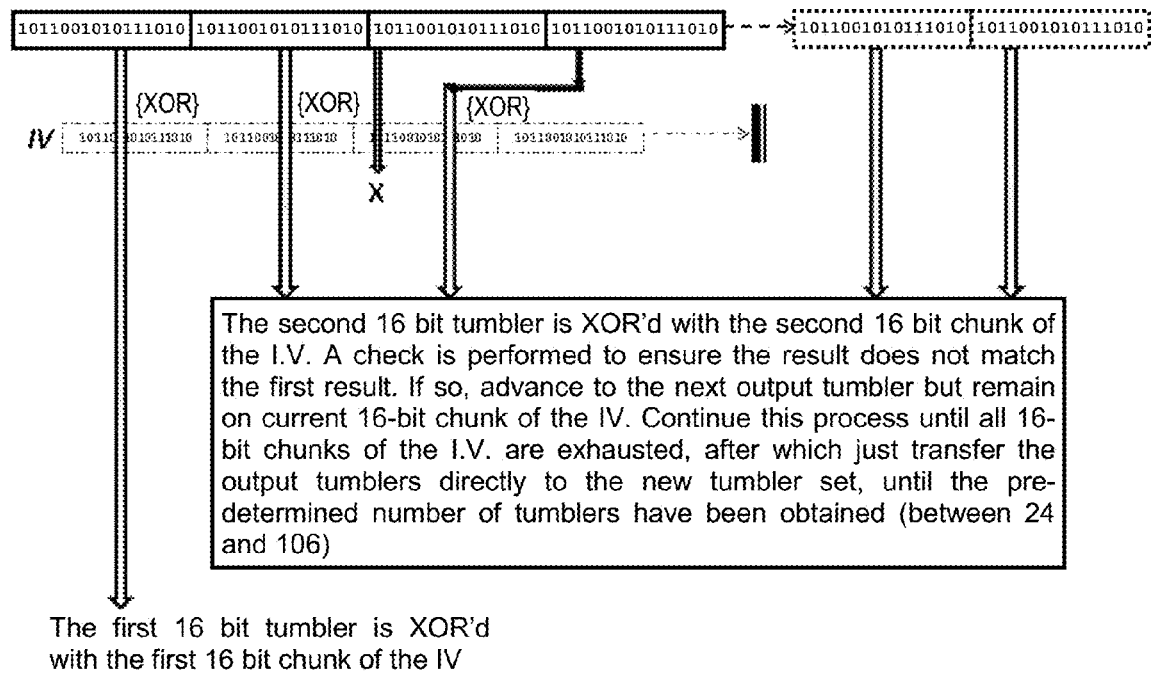
FIG. 4 is a flow diagram of the block key iteration.

The process of iterating Block Key N to Block Key (N+2) is shown pictorially in FIG. 4. Note that tumblers are represented with binary notation. Take the block key most recently used for cryption (or, in the first instance, the constant block key), in the form of between 24 and 106 tumblers inclusive. Each tumbler describes a unique rotation of the Main table. XOR these rotations together; as in the case of creating the constant block key in the previous section, this is best done 16 bits (i.e. 1 tumbler) at a time.

Once the first 16-bit block of the XOR mask is found, it is then XOR'd with the first 16 bits of the IV, resulting in the first 16 bits of block key (N+1), called an "intermediate block key". The same is done for the second 16-bit block, which is then checked to ensure it is not the same as the first. If it is the same and therefore a repeated tumbler, it is discarded and the third 16-bit block of the XOR mask is XOR'd to the same (second) 16-bit block of the IV.

This process is repeated until the entire IV has been exhausted, after which point the process continues for the remainder (T-24) of the tumblers, without the additional step of XOR'ing with the IV.

Once the above process is complete, we have an intermediate block key as a set of between 24 and 106 tumblers. The process of using these tumblers to select rotations of the Main table and XOR'ing to create a new number set is repeated, via the churning process, this time without using the IV. This effectively whitens the effect of the IV over the entire tumbler set, such that it is not confined to just the first 24 tumblers. We have thus now generated a "final block key".

This final block key is used to create a XOR mask in the usual manner. The lower portion of this XOR mask will be used to create the next intermediate block key. The upper half will be used to perform cryption, starting with the file header after the IV. That intermediate block key will be used to form a new final block key. This process continues until all blocks have been crypted.

Block Cryption

Since we now have a final block key, we can perform the cryption function. The XOR mask is generated independent of the plaintext, so the cipher strength is independent of the data being encrypted. This also implies that the entire XOR mask for a file can be precomputed, or run in parallel with (or slightly ahead of) the cryption process.

It should be noted that whilst the strength of the cryptosystem as a whole does not depend on the key or the plaintext, this does not mean that deliberately weak keys (such as just "A") will be robust. What we assert is that no matter how weak the key, it is always easier to perform a brute-force key search than to reverse engineer the XOR-mask and retrieve the original Master or Protomaster key.

If we define a block size of $2^{15}$ bits, or more abstractly, as half the Main table size, the reasons are twofold. First, $2^{15}$ bits is the most common size of a page of data in X86 and X64 architecture, and the predominant block size on modern storage media, yielding better performance relative to other possible block sizes. In addition, the intermediate data is small enough to fit in a CPU level-1 cache, which is extremely fast and protected from certain physical attacks.

We can't have the Main table the same size as a block, due to potential attacks using Gaussian Elimination. This linear algebra technique would allow, in theory at least, solving of the tumbler set, given a XOR mask (which could be found via a known-plaintext attack) provided that the tumbler domain (i.e. $2^{16}$ unique values) is equal in size to the number of bits in the mask. This is the reason that we only use the upper half of the Main table for cryption, and the lower half for key iteration and seeding of the LMD6 secure hash.

It is an open question as to whether or not Gaussian Elimination is, in this case, fast enough to even be practical versus brute-force attacks (as it involves N-factorial operation counts in the general case, which might be vastly reducible due to sparse matrix issues). This can be prevented by halting blocks at exactly half the size required for such attacks, namely $2^{15}$ instead of $2^{16}$ bits. After this point, a block key iteration occurs. In theory, some adaptation of Gaussian Elimination could still be employed, but not in its conventional implementation.

The process of block cryption proceeds as follows. The final block key consists of a tumbler set which describes a XOR mask. The upper half of this XOR mask is used for cryption, not to exceed the length of the remaining plaintext itself. Cryption merely consists of XOR'ing this mask region with the plaintext or ciphertext, after the fashion of an OTP. After this much cryption is done, block key iteration occurs.

Prior to crypting the first block of plaintext, the file header itself must be crypted with the XOR mask derived from the first final block key. This process is slightly different between encryption and decryption.

On encryption, the header (see the "File Format" section) is encrypted starting with the "must_decrypt_to_zero" field. On decryption, the same part of the header is decrypted, and the must_decrypt_to_zero field is checked to ensure that it does, in fact, decrypt to 0. (Otherwise the user is informed that they key is wrong.) It is possible that the wrong key would decrypt this 64-bit field to 0; in that case, however, the LMD6 in the footer would not work out, and the user would be informed, albeit much later. (The LMD6 is discussed in "The LMD6 Secure Hash" section. For the moment, assume it to be a secure hash $2^{10}$ bits long.)

After header cryption, block key iteration occurs. Then in the case of a nonnull plaintext: the plaintext is crypted one block at a time as per above, with block key iteration following each block including the last. The last (which might also be the first) and usually fractional (but nonnull) plaintext block is crypted in a manner which preserves its length. To be clear, the first plaintext block is the second block to be crypted, following the header.

In the case of a null plaintext, a single block key iteration occurs, as through the plaintext consisted of a single block. However, no ciphertext is stored. This merely ensures that the algorithm generates the correct LMD6.

In both the nonnull and null plaintext cases, the LMD6 is always evaluated over a whole block, defined by padding the plaintext with 0's to fill $2^{15}$ bits.

Cryption of the plaintext is now complete. This leaves the LMD6-related footer, which is treated as another fractional block, separated from the last plaintext block by a single block key iteration as mentioned above. Finally, the footer itself is crypted and written to the file.

The LMD6 Secure Hash

The integrity of the encrypted data is protected with a secure hash function known as LMD6. LMD6 is a $2^{10}$-bit hash. It operates on blocks of $2^{15}$ bits, just as with the cryption process, but differs in that it only operates on full blocks, with partial (or null) blocks being padded with 0's to $2^{15}$ bits.

| Name | N | A | B |
|------|---|---|---|
| LMD6 | (512) | $(2^{512}-2^{498}-2^{496}-2^{427})$ | $(2^{512}-2^{481}-2^{404}-2^{362})$ |

The number of bits in each hash is 2N. A and B are multiply-with-carry generator coefficients, in the LMD and LMD2 sense, chosen such that:

$A*(2^N)-1$ is prime;
$A*(2^{(N-1)})-1$ is prime;
$B*(2^N)-1$ is prime;
$B*(2(N-1))-1$ is prime;

and A and B are easy to multiply by (for speed). This is critical so that we can guarantee that the period of the generators (A,X0,C0) and (B,Y0,D0), in which (X0, C0)< >(0,0) and (Y0, D0)< >(0,0), is given by:

$A*(2^{(N-1)})-1$ or $B*(2^{(N-1)})-1$, respectively.

These huge cycle lengths may be guaranteed ahead of time. Transient subcycle resonances are avoided by virtue of the LMD generators' compliance with the Reflexive Density Constant.

Because it may be possible to maliciously construct a block L of data which exhibits resonance with the outputs of a particular LMDx generator:

(1) the seeds are implied by the cryptographic context, but not stored; and (2) we use 2 orthogonal generators to the compute the hash. Such construction is still possible because, after all, the hash is always many times shorter than L itself.

LMD6 should be sufficient to satisfy both hash criteria above. However, it's still encrypted, as a measure of insurance. It's specifically designed to plug into an encryption algorithm which has the following properties:

1. It can produce 4 pseudorandom seeds, each of N bits, to initiate LMD6. These seeds—(x0, c0) and (y0, d0)—are known only to the 2 parties which share a private symmetric encryption key. They are implied by the cryptographic context, and thus not transmitted in any form.

2. It can produce a 2N-bit xor mask, M, which is used to encrypt (by xoring) and decrypt (by xoring again) to the LMD6.

3. Neither of the above pseudorandom values is to be used for other purpose, which might permit statistical analysis attacks.

LMD6 operates on a block of $2^{15}$ bits ($2^{12}$ bytes, or 4KiB) of data—regardless of N. This block is denoted as L. L[N,r] means the (r+1)th N-bit value of the block. For example, L[256,1] means the second 256 bits of the block. The maximum value j of r is thus:

$$j=(2^{15})/N-1$$

Here, then, is the LMD6 in terms of N, A, and B above; the seeds (X0, C0) and (Y0, D0); and the xor mask, M; where "x/y" denotes the integer quotient obtained by dividing x by y.

```
j=(2^15)/N-1
x=X0
c=C0
y=Y0
d=D0
FOR (i=0 to j){
    x=x xor y
    p=(A*(x xor L[N, i])+c) MOD 2^(2N)
    x=p MOD 2^N
    c=p/(2^N)
    q=(B*(y xor L[N, i xor ((j+1 )/2)])+d) MOD 2^(2N)
    y=q MOD 2^N
    d=q/(2^N)
}
p=p+((y*(2^N))+d
p=p MOD 2^(2N)
z=p xor M
```

The LMD6 of the block is then given by z, which is 2N bits long.

LMD6 may appear arbitrary, but every step in the process serves a specific purpose, without which the hash would have known weaknesses. These weaknesses were extrapolated by statistical analysis of comparable hashes where N={8,12,13}. It's possible that other weaknesses (or strengths) occur when N>=128, but I lack the computational tools to expose them. However, the behaviour in the aforementioned "small N" cases is so consistent, as to lend confidence to the latter case.

Assume that z is stored in plain view. Thus we could crack the hash if we could find U such that:
LMD6(L,N,A,B,X0,C0,Y0,D0,M)=LMD6(L',N,A,B,X0,C0,Y0,D0,M xor U)
where L' is a (probably maliciously) modified derivative of L, because we could simply xor U to z.

In order to find U, because the 4 seeds are secret; one must crack the encryption in order to find them, in which case the cracking the LMD6 is probably a moot consideration anyway. One might surmise that $2^{(2N)}$ values of U are possible, given that U consists of 2N bits.

While this may be true in the general case where L and L' do not resemble one another, we want to concentrate on cases where L and L' differ by only a bit. In the worst case, this amounts to setting a single bit in a field of 0s, or clearing a single bit in a field of is. (Anything more complex is probably an exercise in self-deceipt with respect to hash strength.) In these painfully simple cases, it appears that only about 63% of all possible U values are actually roots (solutions) of the above equation.

63% is very close to the Reflexive Density Constant. The upshot is thus that the roots of the hash appear as though chosen at random. In turn, this lends credence to the notion that we have a strong hash, the binary equations for which being as complex as possible, at least in the sense of root obfuscation, given the computational complexity required to compute the hash in the first place. (A more complex option is to create more obfuscated roots, but given the computational cost, the optimal design depends on the application, because if any piece of it is removed, it exhibits statistical weaknesses.)

We endian-flipping the second generator state before adding it to the first, to ensure that the high bit of the generator state is not biased, which it would (slightly) be otherwise. (This is important with respect to the Poisson Criterion.) And we use addition instead of xor because LMD6 would otherwise exhibit weaknesses.

Lastly, the "i xor ((j+1)/2)" in the expression for the second generator ensures that the 2 generators are processing data which is halfway out of phase. What this means is that they are 32 iterations apart. This guards against final-iteration attacks, in which changes to the last chunk of data in the block may fail to result in sufficient bit flips in the hash.

The entire file must be covered by LMD6 protection, except: (1) the data which appears before "size_following" in the header (see the "File Format" section) and (2) the footer, which contains the xor of the LMD6s of all the plaintext blocks (which is nonetheless crypted).

The fraction of the header that falls under LMD6 protection is copied to the base of a $2^{11}$-bit all-zero string (thereby making it not all 0s). This string is then crypted with the XOR mask at bytes 3840 through 4095 (the same mask being used to crypt the first plaintext block after the header). The result is a set of LMD6 seeds which will be used to take the LMD6 of that same block, yet which also incorporate all vulnerable header bits. (This is done in order to prevent wasting time by taking a full LMD6 of a header which is much smaller than a block.)

The seeds for the LMD6 of the next block, if any, are then taken from bytes 3840 through 4095 of the XOR mask used to encrypt the same block. And so on for subsequent blocks, including the last.

The XOR of all LMD6s evaluated above is then computed, resulting in a $2^{10}$-bit hash. (The LMD6 seeds are twice as long as the LMD6 itself.) It is then crypted in the usual manner, immediately following the block iteration following cryption of the last plaintext block (whether null, partial, or full), and appended to the file.

File Format

The following is the file format, and offsets and sizes are given in bytes and written in decimal.

Header

| Offset | Size | Name | Description |
| --- | --- | --- | --- |
| 0 | 48 | initial_value | 384 bits of noise for the prevention of xor mask reuse. |
| 48 | 8 | must_decrypt_to_zero | 0 (for key verification purposes). |
| 56 | 8 | size_following | The size (number of bytes) after this field. |
| 64 | 2 | build_number_of_creator | The build number of the Karacell library used to create this file. |
| 66 | 2 | build_number_needed | The minimum Karacell library build number needed to decode this file (future proofing). |

-continued

| Offset | Size | Name | Description |
|---|---|---|---|
| 68 | 4 | reserved_zero | 0, reserved for future definition. |

Payload

| 88 | size_following-136 | payload | The plaintext. |

Footer

| (size_following)-56 | 128 | xor_of_all_lmd6 | (The xor of the LMD6 hashes of all blocks of payload, padded with 0s out to full block size) or (the LMD6 of a block of 0s if payload is null). Guards against malicious modification. |

Viable Attacks
Brute Force

Assume that a hacker knows a series of bits of the plaintext whose length exceeds the length of the T block key tumblers used to encrypt it. By simply XOR'ing this plaintext to the cipher text, the hacker also knows the XOR mask applied to these bits. The problem is then to deduce, to a useful degree of certainty, the tumbler set which gave rise to the mask. If this can be done easily, then we can assume that the hacker can reverse the encryption process all the way back to the master key.

Start by using publicly available algorithms for generating all possible combinations of T tumblers. Compute the XOR masks corresponding to these tumbler sets. Compare the known part of the real mask to each candidate mask just generated. Repeat until the known part matches the generated part. The T tumblers used to encrypt the block are now known. At this point, the file is considered cracked. Use plaintext analysis to verify correctness, as in any crypto attack.

To continue further back, apply a similar process to discover the T tumblers which were used to encrypt the previous block, by reversing the churning process, including IV XOR'ing. Continue until the master key has been discovered.

Horowitz and Sahni Adaptation

Derived from the work of Horowitz and Sahni, who published the fastest known solution to the Subset Sum Problem, back in 1972. Assume that T is even. (The odd case is more complex, but has a cracking time between the surrounding even cases, and thus offers no particular advantage.)

Produce a list of all possible XOR masks, several bits longer than T/2 tumblers, which can be formed with T/2 tumblers. There will be (216 nCr T/2) entries in this list. Along with the XOR mask, store its generating tumblers. Create a copy of this list. In the original list, XOR every item with the presumed-known piece of XOR mask. Sort both lists, ascending. Walk up the lists at different rates, scanning for the first XOR mask which appears in both lists (but generally not at the same location). Inspect the T tumblers, T/2 from each list, that were used to generate the equal XOR masks. Verify that no tumbler is repeated. If so, continue the search.

It's now likely that the T tumblers have been discovered. If the candidate plaintext fails statistical analysis, then just continue the search. If we neglect the sort, the operation count is (216 nCr T/2).

Optimized Horowitz and Sahni

The above algorithm reveals all (T nCr T/2) ways of forming the correct T tumblers from 2 sets of T/2 tumblers. There are ways of statistically reducing the operation count based on the above fact; fundamentally, the order of the tumblers is irrelevant.

At most, we can reduce the operation count by a factor of (T nCr T/2) based on the above fact. (This appears to be impossible, but it serves as a lower bound.) We ignore the cost of sorting, which might more than double the execution time.

The lower bound operation count is thus ((216 nCr T/2)/(T nCr T/2)). (The expected executed operation count might be half of that, which is probably compensated for by the sort, so we can take this formula as a pessimistic lower bound.) It is this formula which gives rise to the fact that 10-to-43 master key tumblers give rise to 24-to-106 block key tumblers, respectively; essentially, we want to have enough block key tumblers that to reverse them back from the XOR mask using this optimized cracking algorithm would be more complex than simply trying every (well, on average, half of) all possible master keys.

Parallelization

Optimising parallelization offers higher performance for a given level of security. There are too many avenues for parallelization to mention, but a few are as follows:

The process of key iteration and block cryption use many xor operations. These could be parallelized in an aggregating tree of some empirically optimal width and depth.

The blocks themselves do not depend upon one another. Key iteration can be buffered ahead of cryption, allowing many block cryptions to occur in parallel.

LMD6 evaluation can be done opportunistically, behind the cryption pipeline, so long as it's guaranteed to be finished before the output file is closed.

Methods of Key Exchange

The first embodiment is a symmetric encryption algorithm, so the question of key exchange is still an issue. However, since key exchange is a one-time experience for an entire peer relationship lifetime, none of the advantages of would appear to be lost if a known and tested asymmetric algorithm such as RSA or Diffie-Hellman (or even an Elliptic-Curve method) were used for key exchange. Care must be taken to ensure sufficient key length to provide the correct level of future-proofing, and moreover to ensure that the resulting Karacell strength is not compromised by the weaknesses of these asymmetric algorithms. Face-to-face or quantum EPR exchange remain the best options, to the extent that they are practical, the latter being problematic because one must trust a key distribution agency to implement end-to-end EPR, as opposed to a classical emulation.

While example embodiments of the invention have been described in detail, many variations are possible within the scope of the invention as claimed as will be clear to a skilled reader.

The invention claimed is:

1. A method for crypting one or more data blocks comprising:
    providing a main table comprising a circular array of K randomly distributed bits with a predetermined start point;
    generating a master key based on a series expansion of a user key;
    generating a first set of tumblers using the master key, wherein each element of the master key defines a unique bitwise rotation of the main table from the predetermined start point, wherein the first set of tumblers comprises a plurality of tumblers;

performing an XOR operation on the first set of tumblers to form a mask of K bits, wherein performing the XOR operation comprises XORing all of the plurality of tumblers together;
generating a block key based on the mask; and
crypting the one or more data blocks with an XOR operation of the block key.

2. A method according to claim 1, wherein the generating a block key further comprises:
performing a block key iteration based on a previous block key to generate a second set of tumblers; and
wherein crypting the one or more data blocks with an XOR operation of the block key comprises:
performing an XOR operation of the second set of tumblers to form a block mask.

3. A method according to claim 2, wherein the block key iteration further comprises:
generating an intermediate block key based on a set of intermediate block tumblers defining a unique bitwise rotation of the main table from the predetermined starting point, wherein the generating the intermediate block key comprising:
performing an XOR operation on the set of intermediate block tumblers to form an intermediate mask;
selecting from a plurality of contiguous segments of the intermediate mask a first set of intermediate block tumblers, wherein each block tumbler is based on an XOR operation between a segment of the contiguous segments and a corresponding segment of an initialization vector, wherein the first set of intermediate block tumblers defines a unique bitwise rotation of the main table from the predetermined starting point;
selecting from the plurality of contiguous segments of the intermediate mask, excluding the segments corresponding to the first set of intermediate block tumblers, a second set of intermediate block tumblers, wherein each intermediate block tumbler is based on a further segment of the contiguous segments that defines a unique bitwise rotation of the main table from the predetermined starting point;
generating a further block key based on a set of further block tumblers defining a unique bitwise rotation of the main table from the predetermined starting point by:
performing an XOR operation on the set of further block tumblers to form an further block mask; and
selecting from a plurality of contiguous segments of the further block mask a set of further block tumblers, wherein each further block tumbler is based on a segment of the contiguous segments that defines a unique bitwise rotation of the main table from the predetermined starting point.

4. A method according to claim 2, wherein the generating the second set of tumblers comprises an XOR operation between a segment of a previous bit mask and a corresponding segment of an random bit string.

5. A method according to claim 3, wherein the generating the master key further comprises providing a combinatorial decomposition of the user key.

6. A method according to claim 5, further comprising selecting the number of elements, M, to be the minimum M such that (K nCr M) is greater than the integer value, P, of the user key, wherein nCr is the standard combination function.

7. A method according to claim 6, wherein the generating the master key further comprises determining the series expansion of the M elements based on a combinatorial decomposition of the integer value, P, according to:

$$P = (m_0 nCrM) + (m_1 nCrM-1) + (m_2 nCrM-2) + \ldots + (m_{M-1} nCr1)$$

wherein the M elements are denoted $m_0, m_1, \ldots, m_{M-1}$, and nCr is the standard combination function.

8. A method according to claim 7, wherein the determining the M elements further comprises:
determining a first element, $m_0$, within the range [M−1,K−1], where ($m_0$ nCr M)<=P; and
determining further elements, $m_i$, 0<i<M, within the range [M-i−1, ($m_0$ nCr M-i)],
where $$(m_i nCrM - i) <= P - \sum_{j=0}^{i-1} (m_j nCrM - j),$$

wherein nCr is the standard combination function.

9. A method according to claim 1, wherein the step of crypting the one or more data blocks further comprises performing a secure hash function based on a Leidich Message Digest 6, LMD6, secure hash function, wherein one or more seeds of the LMD6 hash function are based on a portion of the block key.

10. A method according to claim 4, wherein the random bit string is generated using a userspace true random number generator which requires no operating system calls and/or is derived from unbiased physical noise.

11. A method according to claim 4, wherein, when encrypting the one or more data blocks, the method further comprises packetizing the one or more data blocks into at least one data packet comprising at least a header and a payload, wherein the header comprises at least the random bit string used for generating the current block key, wherein the payload is encrypted using the block key.

12. A method according to claim 4, wherein, when decrypting the one or more data blocks, the method further comprises receiving at least one packet comprising a header including the random bit string for use in performing the current block key iteration and a payload comprising one or more encrypted data blocks, wherein the payload is decrypted using the block key.

13. A method according to claim 1, wherein when the number of bits K is $2^{16}$:
the number of elements, M, is in the range [10, 43],
the number of block tumblers, T, in a set of block tumblers is in the range [24, 106],
the number of bits in the user key is in the range of $[2^7, 2^9]$,
the number of bits, N, of the block tumblers is 16,
the number of bits in the initialisation vector is 384, and/or
the data block length is $2^{15}$.

14. A non-transitory computer readable medium with computer executable instructions stored thereon executed by a processor to perform a method of crypting one or more data blocks, the method comprising:
providing a main table comprising a circular array of K randomly distributed bits with a predetermined start point;
generating a master key based on a series expansion of a user key;
generating a first set of tumblers using the master key, wherein each element of the master key defines a unique bitwise rotation of the main table from the predetermined start point, wherein the first set of tumblers comprises a plurality of tumblers;

performing an XOR operation on the first set of tumblers to form a mask of K bits, wherein performing the XOR operation comprises XORing all of the plurality of tumblers together;

generating a block key based on the mask; and crypting the one or more data blocks with an XOR operation of the block key.

15. A system for cryption comprising:

a processor and a memory, wherein the memory comprises an application that, when executed on the processor, configures the processor to:

provide a main table comprising a circular array of K randomly distributed bits with a predetermined start point;

generate a master key based on a series expansion of a user key;

generate a first set of tumblers using the master key, wherein each element of the master key defines a unique bitwise rotation of the main table from the predetermined start point, wherein the first set of tumblers comprises a plurality of tumblers;

perform an XOR operation on the first set of tumblers to form a mask of K bits, wherein performing the XOR operation comprises XORing all of the plurality of tumblers together;

generate a block key based on the mask; and crypt the one or more data blocks with an XOR operation of the block key.

* * * * *